United States Patent
Jeong et al.

(10) Patent No.: US 9,479,290 B2
(45) Date of Patent: Oct. 25, 2016

(54) METHOD AND APPARATUS FOR TRANSMITTING AND RECEIVING INFORMATION IN A BROADCASTING/COMMUNICATION SYSTEM

(75) Inventors: Hong-Sil Jeong, Seoul (KR); Sung-Ryul Yun, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 568 days.

(21) Appl. No.: 13/599,551

(22) Filed: Aug. 30, 2012

(65) Prior Publication Data
US 2013/0055051 A1 Feb. 28, 2013

(30) Foreign Application Priority Data

Aug. 30, 2011 (KR) .................. 10-2011-0087464
Jan. 18, 2012 (KR) .................. 10-2012-0005565

(51) Int. Cl.
*H03M 13/00* (2006.01)
*H04L 1/00* (2006.01)

(52) U.S. Cl.
CPC ........... *H04L 1/0068* (2013.01); *H04L 1/0057* (2013.01); *H04L 1/0072* (2013.01); *H04L 1/0065* (2013.01); *H04L 2001/0093* (2013.01)

(58) Field of Classification Search
CPC . H04L 1/0068; H04L 1/0072; H04L 1/0057; H04L 1/0065; H04L 2001/0093
USPC ........................................................ 714/782
See application file for complete search history.

(56) References Cited

U.S. PATENT DOCUMENTS

| | | |
|---|---|---|
| 2003/0126548 A1 | 7/2003 | Chapalain et al. |
| 2004/0153959 A1 | 8/2004 | Kim et al. |
| 2005/0144543 A1 | 6/2005 | Choi et al. |
| 2005/0154958 A1* | 7/2005 | Xia et al. ............. 714/752 |

(Continued)

FOREIGN PATENT DOCUMENTS

| | | |
|---|---|---|
| CN | 101567697 | 10/2009 |
| CN | 101630989 | 1/2010 |

(Continued)

OTHER PUBLICATIONS

Douglas N. Rowitch and Laurence B. Milstein; On the Performance of Hybrid FEC/ARQ Systems Using Rate Compatible PuncturedTurbo (RCPT) Codes; IEEE Transactions on Communications, vol. 48, No. 6, Jun. 2000; p. 948-958.*

(Continued)

*Primary Examiner* — Bryce Bonzo
*Assistant Examiner* — Thien D Nguyen
(74) *Attorney, Agent, or Firm* — The Farrell Law Firm, P.C.

(57) ABSTRACT

A method and apparatus are provided for transmitting and receiving information in a broadcasting/communication system. The method includes comparing a number of bits of an information word to be transmitted with a predetermined threshold value; if the number of bits of the information word is less than the predetermined threshold value, determining a first parameter pair; if the number of bits of the information word is not less than the predetermined threshold value, determining a second parameter pair; determining a number of bits to be punctured based on one of the first parameter pair and the second parameter pair; and puncturing the determined number of bits to be punctured, with respect to parity bits of a codeword generated by encoding the information word.

24 Claims, 11 Drawing Sheets

(56) References Cited

U.S. PATENT DOCUMENTS

| | | | |
|---|---|---|---|
| 2006/0123277 A1* | 6/2006 | Hocevar | 714/704 |
| 2006/0190801 A1 | 8/2006 | Shin et al. | |
| 2007/0101229 A1 | 5/2007 | Niu et al. | |
| 2007/0143656 A1 | 6/2007 | Niu et al. | |
| 2009/0158113 A1 | 6/2009 | Yoon et al. | |
| 2009/0158129 A1 | 6/2009 | Myung et al. | |
| 2009/0204869 A1 | 8/2009 | Myung et al. | |
| 2009/0259913 A1* | 10/2009 | Myung et al. | 714/752 |
| 2009/0259915 A1 | 10/2009 | Livshitz et al. | |
| 2010/0251062 A1* | 9/2010 | Chen et al. | 714/752 |
| 2011/0119568 A1* | 5/2011 | Jeong et al. | 714/790 |
| 2013/0042165 A1 | 2/2013 | Myung et al. | |

FOREIGN PATENT DOCUMENTS

| | | |
|---|---|---|
| CN | 101753264 | 6/2010 |
| CN | 101889398 | 11/2010 |
| CN | 101946413 | 1/2011 |
| CN | 101965687 | 2/2011 |
| CN | 102017558 | 4/2011 |
| JP | 2003-218707 | 7/2003 |
| JP | 2011-514775 | 5/2011 |
| WO | WO 2009/110739 | 9/2009 |

OTHER PUBLICATIONS

Author(s): Hunter, T.E. and Nosratinia, A. ; Performance Analysis of Coded Cooperation Diversity; Date of Conference: May 11-15, 2003; Multimedia Commun. Lab., Texas Univ., Richardson, TX, USA; vol. 4 ; pp. 2688-2692 vol. 4 Product Type: Conference Publications.*

Digital Video Broadcasting (DVB); Next Generation Broadcasting System to Handheld, Physical Layer Specification (DVB-NGH), DVB Documnet A160, Nov. 1, 2012, 18 pages.

Japanese Office Action dated Feb. 8, 2016 issued in counterpart application No. 2014-528262, 8 pages.

Chinese Office Action dated Mar. 28, 2016 issued in counterpart application No. 201280041485.8, 12 pages.

Digital Video Broadcasting, "Frame Structure Channel Coding and Modulation for a Second Generation Digital Terrestrial Television Broadcasting System (DVB-T2)," XP-002523675, DVB Document A122r1, Jan. 2008.

* cited by examiner

METHOD AND APPARATUS FOR TRANSMITTING AND RECEIVING INFORMATION IN A BROADCASTING/COMMUNICATION SYSTEM

PRIORITY

This application claims priority under 35 U.S.C. §119(a) to Korean Patent Application Serial Nos. 10-2011-0087464 and 10-2012-0005565, which were filed in the Korean Intellectual Property Office on Aug. 30, 2011 and Jan. 18, 2012, respectively, the entire disclosure of each of which is hereby incorporated by reference.

BACKGROUND OF THE INVENTION

1. Field of the Invention

The present invention relates generally to transmission and reception of information in a broadcasting/communication system, and more particularly, to a method and apparatus for controlling a code rate according to transmission and reception of signaling information in a broadcasting/communication system.

2. Description of the Related Art

A broadcasting/communication system may experience poor link performance due to noise, a fading phenomenon, and Inter-Symbol Interference (ISI). Thus, to implement high-speed digital broadcasting/communication systems, which require high data throughput and reliability, development of a technique for overcoming noise, fading, and ISI is essential. To address these issues, research is currently being conducted on an error-correcting code, e.g., a Low-Density Parity Check (LDPC) code, for improving the reliability of broadcasting/communication by efficiently restoring distortion of information to an original state.

More specifically, an LDPC encoder receives LDPC information bits (or an LDPC information word or an LDPC uncoded block) having $K_{ldpc}$ bits to generate LDPC coded bits (or an LDPC code word, an LDPC codeword, or an LDPC coded block) having $N_{ldpc}$ bits. If the length of LDPC information bits input to the LDPC encoder, $K_{ldpc}$, is shorter than the length of an input information bits (or input information word) to be encoded, $K_{sig}$, then a transmission end performs encoding after a shortening process. If the number of parity bits used by the transmission end, i.e., a parity bit length, $N_{tx\_parity}$, is shorter than the length of parity bits output from the encoder, $(N_{parity}=N_{ldpc}-K_{ldpc})$, the transmission end punctures the parity bits output from the encoder by $(N_{parity}-N_{tx\_parity})$.

If the shortening bit length increases, a code rate decreases, such that Bit Error Rate (BER)/Frame Error Rate (FER) performance may be improved in comparison to a code before shortening. However, if the puncturing bit length increases, a code rate also increases, such that the BER/FER performance may be degraded in comparison to a code before puncturing. Therefore, to maintain similar performance regardless of the length of an information word for system stability, a technique for selecting the appropriate number of puncturing bits according to the length of an information word is required.

SUMMARY OF THE INVENTION

Accordingly, the present invention is designed to address at least the problems and/or disadvantages described above and to provide at least the advantages described below.

An aspect of the present invention is to provide a method and apparatus for transmitting and receiving information in a broadcasting/communication system.

Another aspect of the present invention is to provide a method and apparatus for controlling a code rate in a broadcasting/communication system.

Another aspect of the present invention is to provide a method and apparatus for selecting a shortening/puncturing rate according to a length of an information word in a broadcasting/communication system.

Another aspect of the present invention is to provide a method and apparatus for determining a number of bits to be punctured according to a length of an input information word in a broadcasting/communication system.

In accordance with an aspect of the present invention, a method for transmitting information in a broadcasting/communication system is provided. The method includes comparing a number of bits of an information word to be transmitted with a predetermined threshold value, if the number of bits of the information word is less than the threshold value, determining a first parameter pair, if the number of bits of the information word is not less than the threshold value, determining a second parameter pair, determining a number of bits to be punctured based on one of the first parameter pair and the second parameter pair, and puncturing the determined number of bits to be punctured, with respect to parity bits of a codeword generated by encoding the information word.

In accordance with another aspect of the present invention, an apparatus for transmitting information in a broadcasting/communication system is provided. The apparatus includes an encoder for encoding an information word to be transmitted and outputting a codeword; a controller for comparing a number of bits of the information word with a predetermined threshold value, determining a first parameter pair, if the number of bits of the information word is less than the predetermined threshold value, determining a second parameter pair, if the number of bits of the information word is not less than the predetermined threshold value, and determining a number of bits to be punctured, based on one of the first parameter pair and the second parameter pair; and a puncturer for puncturing the determined number of bits to be punctured, with respect to parity bits of the codeword.

In accordance with another aspect of the present invention, a method for receiving information in a broadcasting/communication system is provided. The method includes comparing a number of bits of an information word transmitted by a transmission end with a predetermined threshold value, determining a first parameter pair, if the number of bits of the information word is less than the predetermined threshold value, determining a second parameter pair, if the number of bits of the information word is not less than the predetermined threshold value, determining a number of bits to be punctured, based on one of the first parameter pair and the second parameter pair, generating values corresponding to bits punctured by the transmission end and padding the generated values to a modulated signal of a received signal to generate a decoder input by using the determined number of bits to be punctured, and decoding the decoder input to reconstruct information word bits.

In accordance with another aspect of the present invention, an apparatus for receiving information in a broadcasting/communication system is provided. The apparatus includes a demodulator for demodulating a received signal; a controller for obtaining information about a number of bits of an information word transmitted from a transmission end, comparing the number of bits of the information word transmitted by the transmission end with a predetermined threshold value, determining a first parameter pair, if the number of bits of the information word is less than the predetermined threshold value, determining a second parameter pair, if the number of bits of the information word is not less than the predetermined threshold value, and determining a number of bits to be punctured, based on one of the first parameter pair and the second parameter pair; a puncturing processor for generating values corresponding to the bits punctured by the transmission end by using the determined number of bits to be punctured, and padding the generated values to an output signal of the demodulator; and a decoder for receiving and decoding output values of the puncturing processor to reconstruct information word bits.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Figure 1:
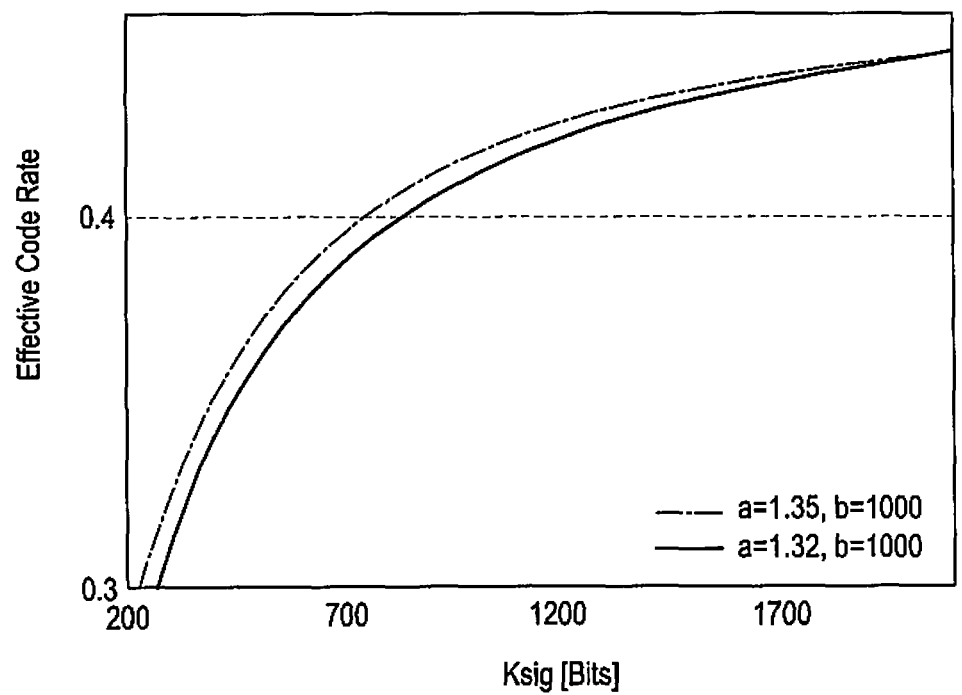
FIG. 1 is a graph illustrating a change in a code rate according to an embodiment of the present invention.

Various embodiments of the present invention will be described in detail below with reference to the accompanying drawings. Well-known functions and structures will not be described if they may unnecessarily obscure the subject matter of the present invention. Further, the terms used herein are defined based on functions in the present invention and may vary according to users, operator intention, or usual practices. Therefore, definitions of the terms should be made based on the content throughout the specification.

Although the following description of the present invention is based on a Digital Video Broadcasting the $2^{nd}$ Generation Terrestrial (DVB-T2) system, which is the Europe digital broadcasting standard, and a Digital Video Broadcasting Next Generation Handheld (DVB-NGH) system, which is being currently standardized, the present invention is equally applied to other systems.

Additionally, although the following description controls a code rate corresponding to transmission of signaling information, the present invention is also applicable to the transmission of other information.

In a transmission end of a broadcasting/communication system, an LDPC encoder receives $K_{ldpc}$ LDPC information bits, generates $N_{parity}$ parity bits, and outputs $N_{ldpc}$ ($=K_{ldpc}$+ $N_{parity}$) LDPC coded bits. In the following description, for convenience' sake, the input and output of "bits" will be described, but the same description is also applied to the input and output of symbols.

When signaling bits of a variable length are input to an encoder, a transmission end may perform shortening and/or puncturing (hereinafter referred to as "shortening/puncturing"). That is, if a length of LDPC information bits of the LDPC encoder is $K_{ldpc}$ and signaling bits having a bit length of $K_{sig}$ are input to the LDPC encoder, ($K_{ldpc}-K_{sig}$) bits are shortened. Herein, shortening means padding ($K_{ldpc}-K_{sig}$) '0' bits to the signaling bits for LDPC encoding, and after LDPC encoding, deleting the padded '0' bits, or reducing the size of a parity check matrix of the LDPC encoder, which has the same effect as shortening based on the padding and deletion. Further, puncturing means excluding some of encoding bits, especially, parity bits, from a transmission.

The transmission end of the broadcasting/communication system may use two concatenated encoders. For example, an encoder that concatenates a Bose, Chaudhuri, Hocquenghem (BCH) code with an LDPC code, i.e., a BCH/LDPC encoder, receives BCH information bits (BCH information or information bits) having $K_{bch}$ bits and outputs BCH coded bits (or BCH codeword or a BCH coded block) having $N_{bch}$ bits. $N_{bch}$ is equal to the number of LDPC information bits, $K_{ldpc}$, and the $N_{bch}$ bits may also be referred to as LDPC information bits (or an LDPC uncoded block), which is information input to the LDPC encoder. The BCH coded bits, i.e., the LDPC information bits, are input to the LDPC encoder and are output as LDPC coded bits, an LDPC coded block, or an LDPC codeword having a length of $N_{ldpc}$.

When an information word, which includes signaling bits having a variable length, is input to an encoder, a transmission end performs shortening/puncturing with respect to a codeword output from the encoder. That is, signaling bits having a bit length of $K_{sig}$ are input to the BCH/LDPC encoder and ($K_{bch}-K_{sig}$) bits are shortened. As described above, shortening means that ($K_{bch}-K_{sig}$) '0' bits are padded to the input signaling bits and are BCH/LDPC encoded, and then the padded '0' bits are deleted.

As described above, shortening reduces a code rate, such that as the number of bits to be shortened (i.e., a shortening bit length) increases, encoding performance improves. However, when signaling information is encoded, it is preferable that encoding performance should not vary with the length of input information. That is, when reception power in a receiver is constant, it is preferable that performance should not differ with the length of input information word. Therefore, by adjusting the number of bits to be punctured (i.e., a puncturing bit length) according to the number of bits to be shortened, stable encoding performance is provided. The number of bits to be punctured is determined according to a bit length of input information word, i.e., a bit number of the input information word, such that the number of bits to be punctured depends on the bit number of the input information word.

Hereinbelow, embodiments for determining an input parameter used for puncturing, i.e., the number of bits to be punctured, $N_{punc}$, will be described.

In one embodiment, $N_{punc}$ may be calculated using one of Equations (1) to (4).

Equation (1) is used when a BCH code is concatenated and Equation (2) is used when a BCH code is not concatenated. That is, when the BCH code is concatenated, the number of bits to be shortened is ($K_{bch}-K_{sig}$), such that $N_{punc}$ may be calculated using Equation (1).

$$N_{punc} = \lfloor A \times (K_{bch} - K_{sig}) - B \rfloor \text{ where } 0 \leq B \quad (1)$$

When the BCH code is not concatenated, the number of bits to be shortened is ($K_{ldpc}-K_{sig}$), such that $N_{punc}$ may be calculated using Equation (2).

$$N_{punc} = \lfloor A \times (K_{ldpc} - K_{sig}) - B \rfloor \text{ where } 0 \leq B \quad (2)$$

In Equations (1) and (2), A indicates a rate of the number of bits to be shortened to the number of bits to be punctured, and ($K_{bch}-K_{sig}$) and ($K_{ldpc}-K_{sig}$) indicate the number of bits to be shortened. $K_{bch}$ indicates the number of BCH information bits (i.e., an information bit length) input to generate BCH coded bits including $K_{ldpc}$ bits through BCH encoding. $K_{ldpc}$ indicates the number of LDPC information bits input to generate the LDPC coded bits. $K_{sig}$ indicates a bit length of an information word input to the encoder before shortening B indicates a correction factor. The operation $\lfloor x \rfloor$ indicates a floor function and means the largest integer less than or equal to x.

When the number of bits to be punctured is calculated based on Equations (1) or (2), a lower code rate can be obtained than when shortening and puncturing are not performed. In the foregoing description, if B is 0, it can be omitted.

Alternatively, when $N_{punc}$ is calculated using Equations (3) or (4), a lower code rate can be obtained than when shortening and puncturing are not performed.

More specifically, when the BCH code is concatenated, the number of bits to be shortened is ($K_{bch}-K_{sig}$), such that $N_{punc}$ may be calculated using Equation (3).

$$N_{punc} = \lfloor A \times (K_{bch} - K_{sig}) + B \rfloor$$

$$\text{where } 0 \leq B < N_{parity} - A(K_{bch} - K_{sig\_min}) \quad (3)$$

When the BCH code is not concatenated, the number of bits to be shortened is ($K_{ldpc}-K_{sig}$), such that $N_{punc}$ may be calculated using Equation (4).

$$N_{punc} = \lfloor A \times (K_{ldpc} - K_{sig}) + B \rfloor$$

$$\text{where } 0 \leq N_{parity} - A(K_{ldpc} - K_{sig\_min}) \quad (4)$$

In Equations (3) and (4), A indicates a rate of the number of bits to be shortened to the number of bits to be punctured, and ($K_{bch}-K_{sig}$) and ($K_{ldpc}-K_{sig}$) indicate the number of bits to be shortened. $K_{bch}$ indicates the number of BCH information bits (i.e., an information bit length) input to generate BCH coded bits composed of $K_{ldpc}$ bits through BCH encoding. $K_{ldpc}$ indicates the number of LDPC information bits input to generate the LDPC coded bits. $K_{sig}$ indicates a bit length of an information word input to the encoder before shortening B indicates a correction factor. $K_{sig\_min}$ indicates a bit length of the shortest information word among information words that can be input to the encoder.

In Equations (3) and (4), $N_{punc}$ is smaller than the number of parity bits, $N_{parity}$, only when a condition of $B < N_{parity} - A(K_{ldpc} - K_{sig\_min})$ is satisfied.

In Equations (1) to (4), $N_{punc}$ may change according to the parameters A and B. Accordingly, a code rate may change according to A and B. When $K_{ldpc}$ bits are input and $N_{ldpc}$ coded bits are output, a code rate of an LDPC code, R, may be calculated using Equation (5).

$$R = \frac{K_{ldpc}}{N_{ldpc}} \quad (5)$$

For $K_{sig}$ input information word bits, an effective code rate $R_{eff}$ after shortening and puncturing is calculated using Equation (6).

$$R_{eff} = \frac{K_{sig}}{K_{sig} + N_{bch\_parity} + (N_{parity} - N_{punc})} \quad (6)$$

In Equation (6), $N_{bch\_parity}$ indicates the number of parity bits of a BCH code, which is 0 when a BCH code is not used.

FIG. 1 is a graph illustrating a change in an effective code rate according to an embodiment of the present invention. Specifically, FIG. 1 illustrates a change in a code rate for $K_{bch}=2100$, $K_{ldpc}=2160$, and $N_{ldpc}=8640$, when A=1.35 and B=3320 are applied to Equation (3) and when A=1.32 and B=3320 are applied to Equation (3). As is shown, a code rate for transmission of information varies with A, i.e., as A increases, a code rate also increases.

Figure 2:
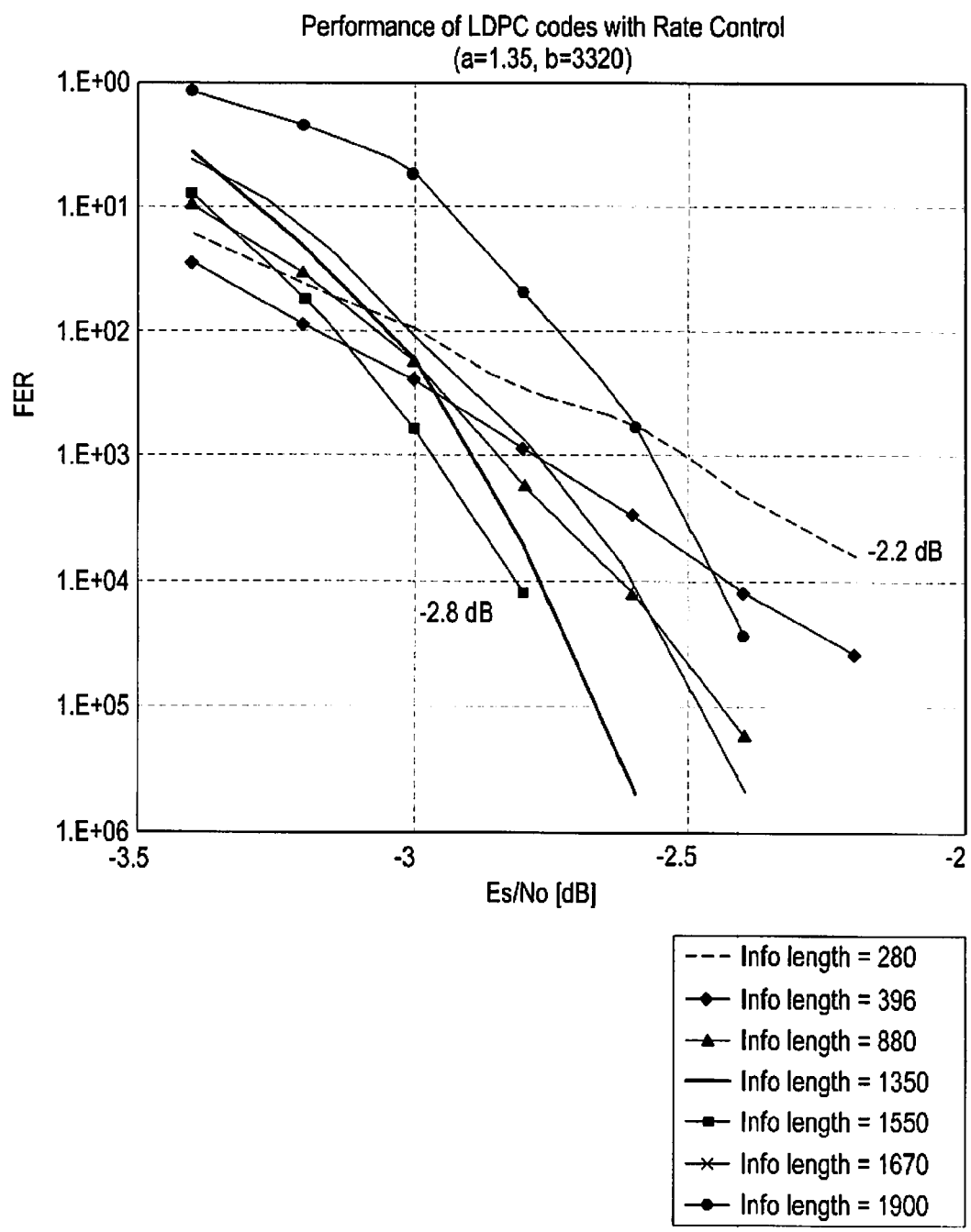
FIGS. 2 and 3 are graphs illustrating efficiency of an LDPC code according to an embodiment of the present invention.

FIG. 2 illustrates a Frame Error Rate (FER) of a codeword with respect to various information bit lengths of 280, 396, 880, 1350, 1550, 1670, and 1900 for A=1.35 and B=3320.

Referring to FIG. 2, when the number of input information bits, $K_{sig}$, is 280, performance degradation occurs. Therefore, for FER=10e-4, a performance difference between the best performance and the worst performance is 0.7 dB.

Figure 3:
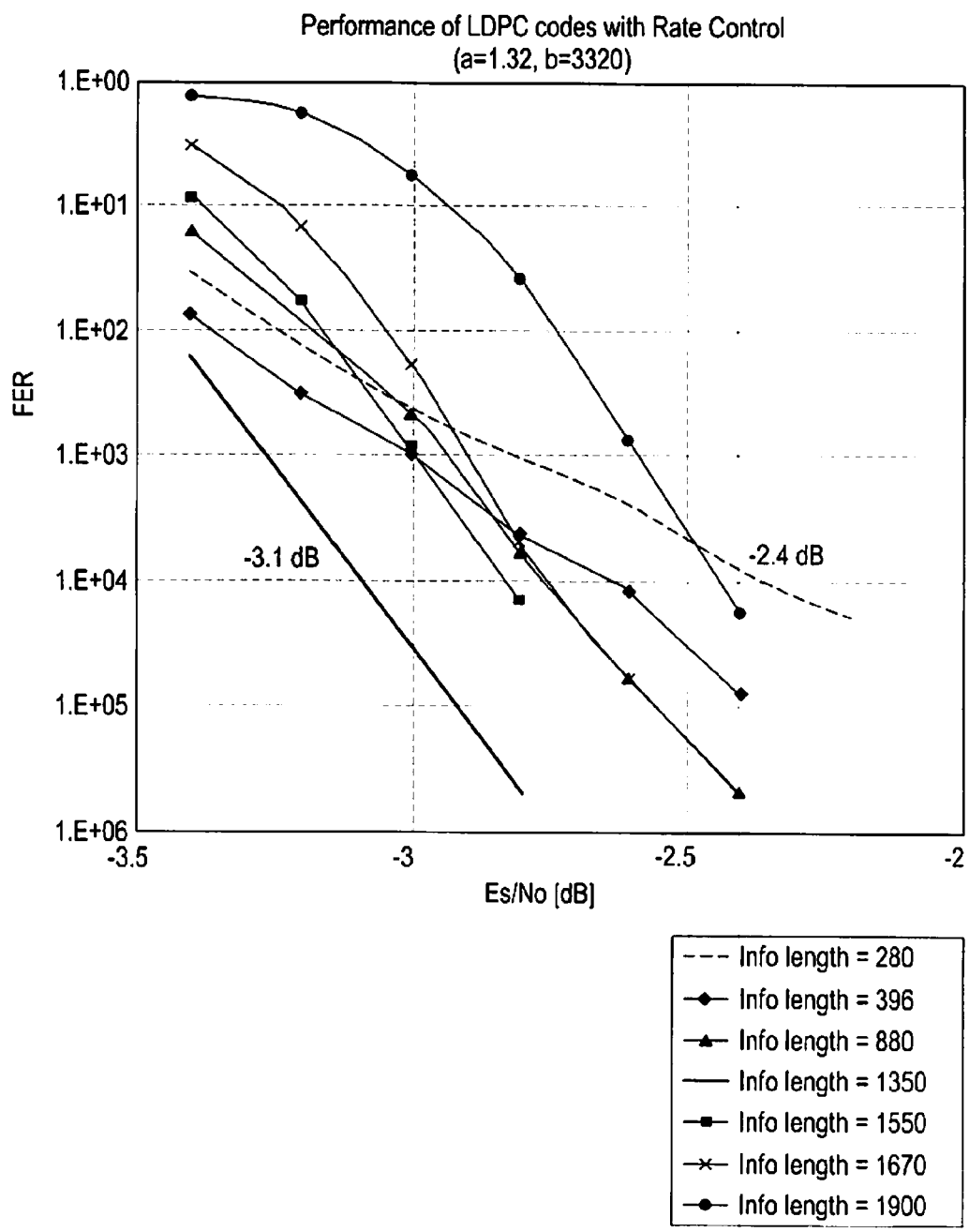

FIG. 3 illustrates an FER of a codeword with respect to various information bit lengths of 280, 396, 880, 1350, 1550, 1670, 1900 for A=1.32 and B=3320.

Referring to FIG. 3, a code rate is lower than that in FIG. 2, such that overall performance improvement is achieved. In particular, when the number of input information bits, $K_{sig}$, is 1350, performance is much better than in other cases. It can also be seen that for FER=10e-4, a performance difference between the best performance and the worst performance is 0.7 dB.

As described above, it is preferable that encoding performance does not differ much with an input information bit length. Thus, a method for adjusting A and B in Equations (1) to (4) according to an input information bit length is required.

Therefore, in accordance with an embodiment of the present invention, $N_{punc}$ is determined using Equations (7) and (8).

$$\text{If } K_{sig} < K_{th} \quad (7)$$
$$N_{punc} = \lfloor A_1 \times (K_{bch} - K_{sig}) + B_1 \rfloor$$
$$\text{else}$$
$$N_{punc} = \lfloor A_2 \times (K_{bch} - K_{sig}) + B_2 \rfloor$$

$$\text{If } K_{sig} < K_{th} \quad (8)$$
$$N_{punc} = \lfloor A_1 \times (K_{ldpc} - K_{sig}) + B_1 \rfloor$$
$$\text{else}$$
$$N_{punc} = \lfloor A_2 \times (K_{ldpc} - K_{sig}) + B_2 \rfloor$$

In Equations (7) and (8), different values of A and B, i.e., $A_1$ and $B_1$ or $A_2$ and $B_2$ are used according to an input information bit length.

If $B_1$ is integer, the Equation (7) can be modified to the following Equation (7a).

$$N_{punc} = \lfloor A \times (K_{bch} - K_{sig}) \rfloor + B_1 \quad (7a)$$

If $A_1 = C+D$ (where C is integer and D is real number), the Equation (7) can be modified into Equation (7b).

$$N_{punc} = \lfloor A_1 \times (K_{bch} - K_{sig}) \rfloor + B_1 = C \times (K_{bch} - K_{sig}) + \lfloor D \times (K_{bch} - K_{sig}) \rfloor + B_1 \quad (7b)$$

Also, the Equation (8) can be modified in similar to the Equations (7a) and (7b).

In Equations (7) and (8), a case of an input information bit length being less than a predetermined threshold value $K_{th}$ and a case of the input information bit length being greater than the threshold value $K_{th}$ are divided. However, a plurality of threshold values may be used to divide a case of the input information bit length, such that two or more pairs of A and B may be used.

$K_{th}$ may be experimentally determined not to cause an encoding performance difference with $N_{punc}$. In particular, a value corresponding to a case where performance is relatively good or a case where performance is relatively bad is determined as $K_{th}$. In addition, different parameter pairs ($A_1$, $B_1$) and ($A_2$, $B_2$) are determined such that for $K_{sig} = K_{th}$, $N_{punc}$ values are equal to each other.

As described above, the number of bits to be punctured is preferably adjusted according to the number of bits to be shortened, and the number of bits to be shortened is determined according to a bit length of an input information word. Thus, $A_1$ and $A_2$ indicating ratios of the number of bits to be shortened to the number of bits to be punctured may be constant values determined according to a bit length of an input information word. Therefore, $B_1$ and $B_2$ may be determined as constant values.

Once $N_{punc}$ is determined as described above, the transmission end punctures parity bits among coded bits generated by encoding input information bits with $N_{punc}$.

Figure 4:
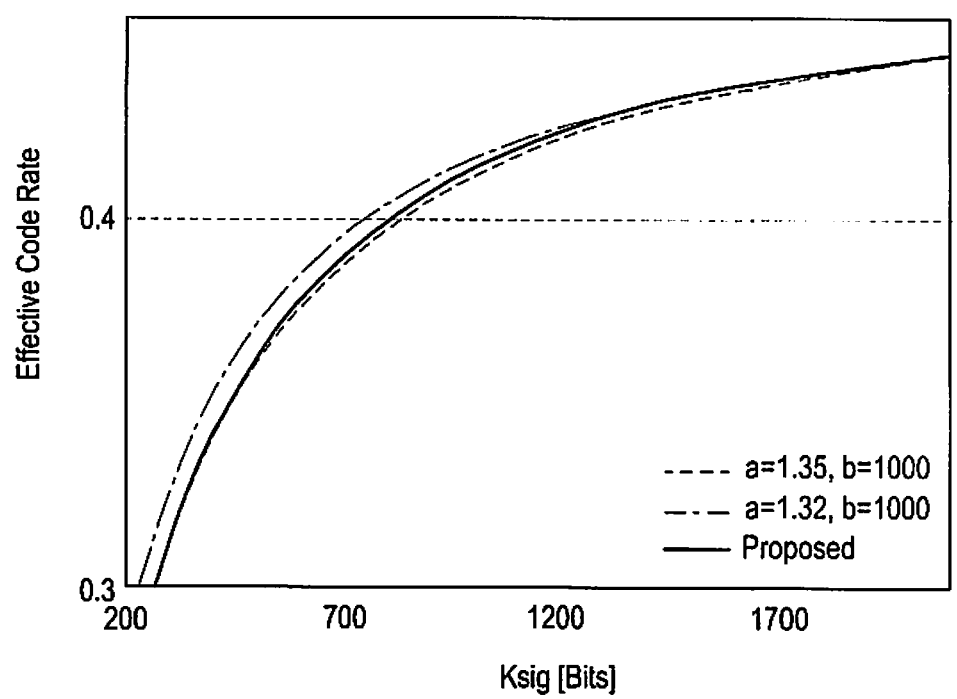
FIG. 4 is a graph illustrating a change in an effective code rate according to an embodiment of the present invention.

FIG. 4 is a graph illustrating a change in an effective code rate according to an embodiment of the present invention, where A=1.35 and B=3320 in Equation (3), and A=1.32 and B=3320 in Equation (3) are compared with using Equations (7) and (8), which is indicated as "proposed".

Specifically, "proposed" indicates that $K_{bch}$=2100, $K_{ldpc}$=2160, $N_{ldpc}$=8640, $A_1$=1.3, $B_1$=3357, $A_2$=1.35, $B_2$=3320, and $K_{th}$=1350 are applied to Equation (7). As illustrated in FIG. 4, when $K_{sig}$ is more than 1350, which is equal to $K_{th}$, the "proposed" case shows the same code rate as when A=1.35 and B=3320 in Equation (3).

Figure 5:
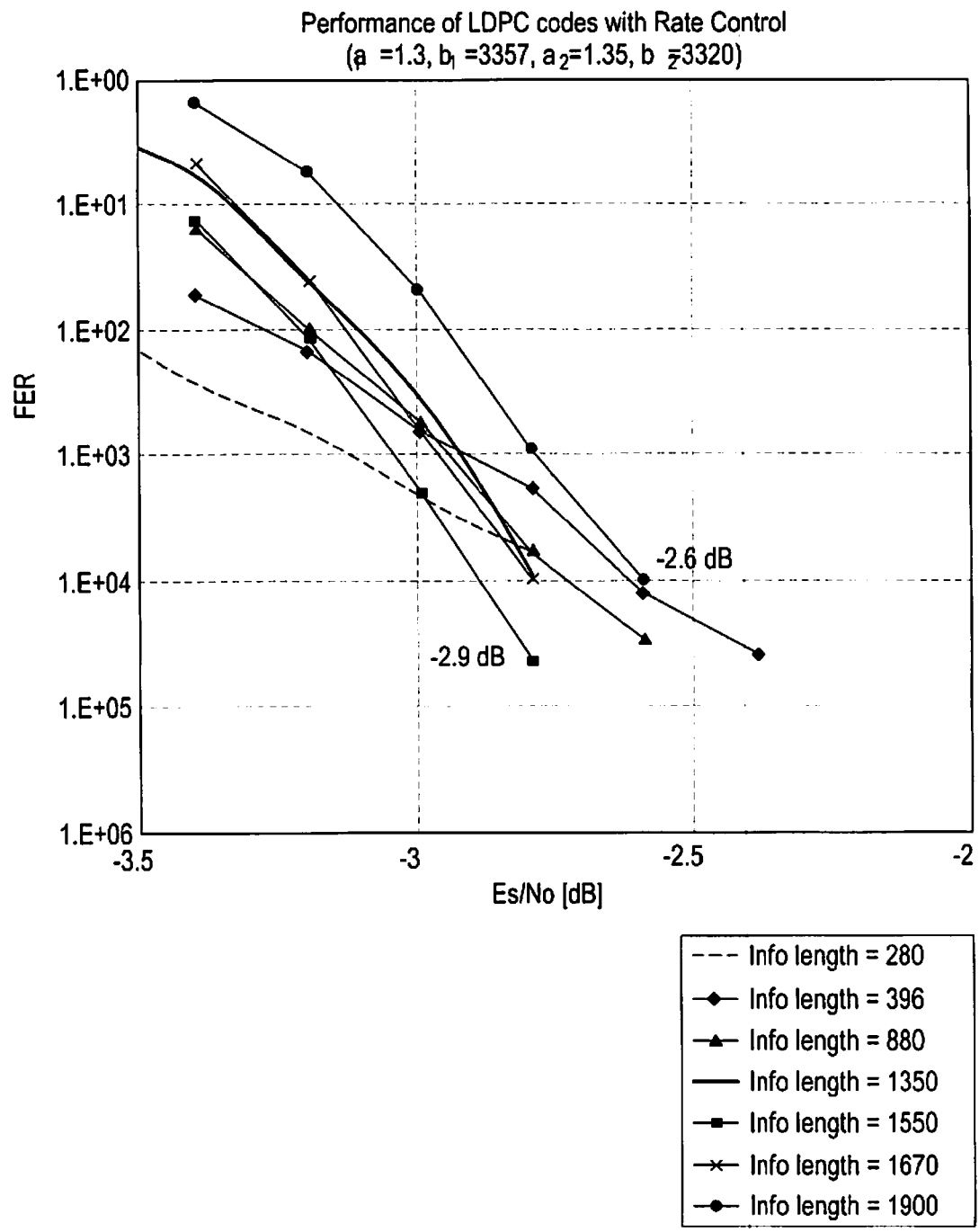
FIG. 5 is a graph illustrating efficiency of an LDPC code according to an embodiment of the present invention.

FIG. 5 is a graph illustrating an FER according to an embodiment of the present invention. Specifically, FIG. 5 illustrates FER performance with respect to various information bit lengths of 280, 396, 880, 1350, 1550, 1670, and 1900.

Referring to FIG. 5, for an input information bit length of 280, a code rate is lower than illustrated in FIG. 2, such that performance is better. For an input information bit length of 1350, a code rate is higher than illustrated in FIG. 3, such that performance degradation occurs. Therefore, an overall performance difference is 0.3 dB and an encoding performance difference is reduced when compared to FIGS. 2 and 3.

In the description above, the number of bits to be punctured, $N_{punc}$, is calculated by using the foregoing equations. However, in the following description, a value obtained using the foregoing equations is assumed to be a temporary value of $N_{punc}$, i.e., a temporary number of bits to be punctured, $N_{punc\_temp}$, and through several processes, $N_{punc}$ is obtained more precisely.

In accordance with an embodiment of the present invention, the transmission end, when performing puncturing by using $N_{punc}$, may more precisely adjust $N_{punc}$ according to additional parameters, e.g., the number of BCH parity bits, a modulation order, etc. Hereinafter, a procedure for calculating the final number of bits to be punctured using $N_{punc\_temp}$ will be described.

Step 1:

The temporary number of bits to be punctured, $N_{punc\_temp}$ is calculated using Equation (9), which is substantially the same as the above-described Equation (7) and the description related thereto.

$$N_{punc\_temp} = \begin{cases} \text{If } K_{sig} < 1350, \lfloor 1.3 \times (K_{bch} - K_{sig}) + 3357 \rfloor \\ \text{Otherwise,} \lfloor 1.35 \times (K_{bch} - K_{sig}) + 3320 \rfloor \end{cases} \quad (9)$$

An LDPC code concatenated with a BCH code is used, and in Equation (9), values $(A_1, B_1)=(1.3, 3357)$ and $(A_2, B_2)=(1.35, 3320)$ of FIG. 4 are used.

Step 2:

The temporary number of bits to be encoded, $N_{post\_temp}$, is calculated using $N_{punc\_temp}$ as shown in Equation (10).

$$N_{post\_temp} = K_{sig} + N_{bch\_parity} + N_{ldpc\_parity\_ext\_4K} - N_{punc\_temp} \quad (10)$$

In Equation (10), $K_{sig}$ indicates the number of input information bits as described above, and for example, it may indicate the number of signaling information bits. $N_{bch\_parity}$ indicates the number of BCH parity bits, and $N_{ldpc\_parity\_ext\_4K}$ indicates a constant value determined according to a type of an LDPC code.

Step 3:

Taking $N_{post\_temp}$ and a modulation order into account, the final number of bits to be encoded (a bit number of each LDPC block) is calculated using Equation (11a):

$$N_{post} = \left\lceil \frac{N_{post\_temp}}{2\eta_{MOD}} \right\rceil \times 2\eta_{MOD} \quad (11a)$$

In Equation (11a), $\eta_{MOD}$ indicates a modulation order, which is 1, 2, 4, and 6 for Binary Phase Shift Keying (BPSK), Quadrature PSK (QPSK), 16-ary Quadrature Amplitude Modulation (16-QAM), and 64-ary QAM (64-QAM), respectively.

Determining the number of encoded bits of each information word block, $N_{post}$, as shown in Equation (11a), causes $N_{post}$ to be a multiple of the number of columns of a block interleaver. The block interleaver, although not being shown and additionally described, is used when bits of each LDPC block is bit-interleaved later.

When the block interleaver is not used, for example, when only BPSK and QPSK are used, Equation (11a) can be converted into Equation (11b).

$$N_{post} = \left\lceil \frac{N_{post\_temp}}{\eta_{MOD}} \right\rceil \times \eta_{MOD} \quad (11b)$$

Step 4:

The number of bits to be punctured among parity bits of each LDPC block, $N_{punc}$, is calculated using Equation (12).

$$N_{punc} = N_{punc\_temp} - (N_{post} - N_{post\_temp}) \quad (12)$$

Figure 6:
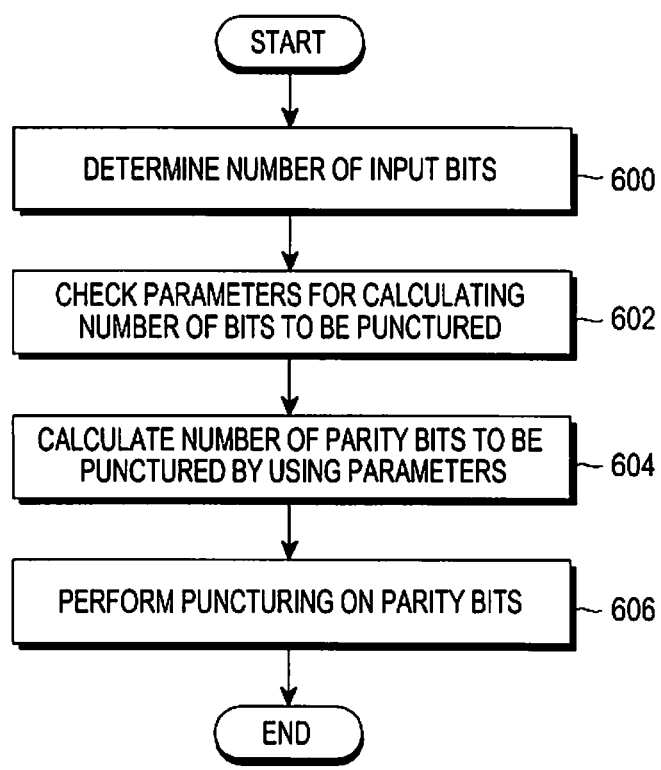
FIG. 6 is a flowchart illustrating a procedure for puncturing parity bits based on an information bit length according to an embodiment of the present invention.

FIG. 6 is a flowchart illustrating a procedure for puncturing parity bits based on an input information bit length according to an embodiment of the present invention.

Referring to FIG. 6, in step 600, the number of input information bits including signaling information for transmission (i.e., an input information bit length) is determined. In step 602, the transmission end checks parameters for calculating the number of bits to be punctured, i.e., a puncturing bit length. That is, the transmission end determines whether to select $(A_1, B_1)$ or $(A_2, B_2)$ according to the input information bit length using Equations (7) and (8). Although not shown, one of two or more predetermined parameter pairs may be selected according to the input information bit length. Alternatively, in step 602, the transmission end may obtain parameter values $(A_1, B_1) = (1.3, 3357)$ or $(A_2, B_2) = (1.35, 3320)$ to be used in Equation (9) according to a result of comparison of the input information bit length with a predetermined threshold value of 1350.

In step 604, the number of parity bits to be punctured (i.e., a puncturing parity bit length) is calculated based on the determined parameters, e.g., using Equations 7 and 8 or Equations (9) to (12). In step 606, parity bits of a codeword are punctured based on the calculated puncturing parity bit length.

The parity bits generated with respect to the signaling bits, which are the input information bits, may be transmitted in a distributed manner through the same frame as a frame in which the signaling bits are transmitted and a preceding frame. The parity bits transmitted through the same frame as that which carries the signaling bits will be referred to herein as a first parity, and the parity bits transmitted through the preceding frame will be referred to herein as a second parity or an additional parity.

Figure 7:
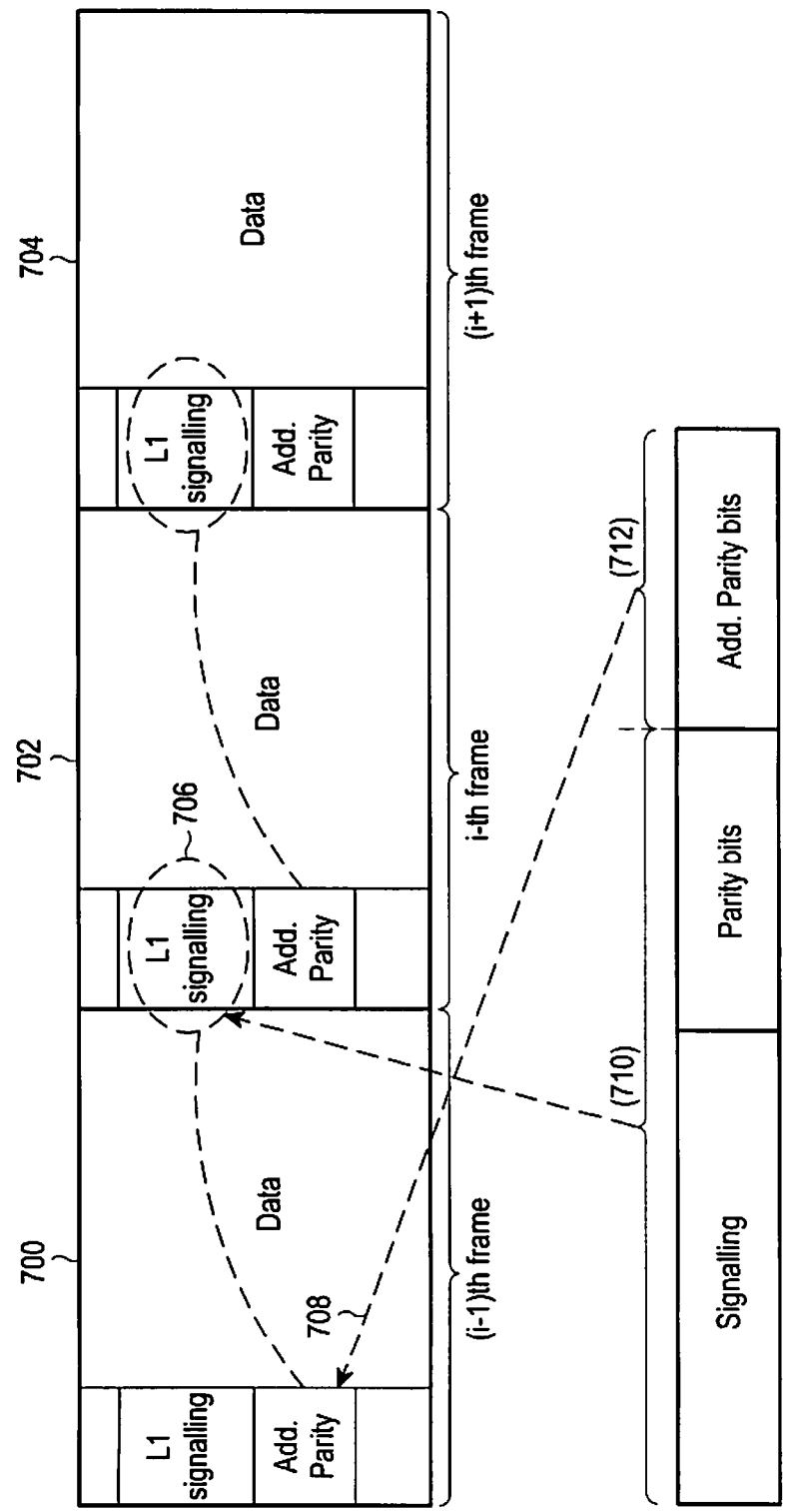
FIG. 7 is a diagram illustrating a frame structure for transmitting two types of parity bits according to an embodiment of the present invention.

FIG. 7 is a diagram illustrates a frame structure for transmitting two types of parity bits according to an embodiment of the present invention.

Referring to FIG. 7, Layer-1 signaling bits are transmitted through an $i^{th}$ frame 702; a first parity 710 generated for signaling bits is transmitted through the $i^{th}$ frame 702, together with the signaling bits; and an additional parity 712 is transmitted through an $(i-1)^{th}$ frame 700.

In accordance with an embodiment of the present invention, a reception end performs decoding based on the signaling bits and the first parity 710 received through the $i^{th}$ frame 702. If decoding fails, the reception end also performs decoding using the additional parity 712 received through the $(i-1)^{th}$ frame 700.

In accordance with another embodiment of the present invention, if decoding with respect to the signaling bits and the first parity 710 fails, the reception end determines that decoding with respect to the signaling bits fails, stores an additional parity included in the $i^{th}$ frame 702, and then receives an $(i+1)^{th}$ frame.

In accordance with yet another embodiment of the present invention, the reception end stores the additional parity 712 received through the $(i-1)^{th}$ frame 700 at all times, and performs decoding based on the signaling bits and the first parity 710 received through the $i^{th}$ frame 702 and the stored additional parity 712.

Herein below, a method for determining the number of additional parity bits will be described in more detail.

In accordance with an embodiment of the present invention, the number of additional parity bits may be expressed using Equation (13).

$$N_{add\_parity} = \alpha \cdot I_1 \cdot N_{tx\_parity}, \quad l = \{0, 1, \ldots, L-1\} \quad (13)$$

In Equation (13), $\alpha \cdot I_1$ indicates a ratio of the number of first parity bits to the number of additional parity bits, where $\alpha$ is a fixed value, $I_l$ may be selected between 0 and L−1, and L1 indicates an L1 additional parity ratio. $I_l$ may be transmitted through separate signaling 'L1_AP_RATIO'. When $I_l=0$, additional parity bits are not used. $N_{tx\_parity}$ indicates the number of parity bits transmitted through the same frame as that for an information word (i.e., the first parity bits), and may also mean the number of parity bits to be actually transmitted. In this case, $N_{tx\_parity}$ may be calculated as $N_{parity} - N_{punc}$.

Figure 8:
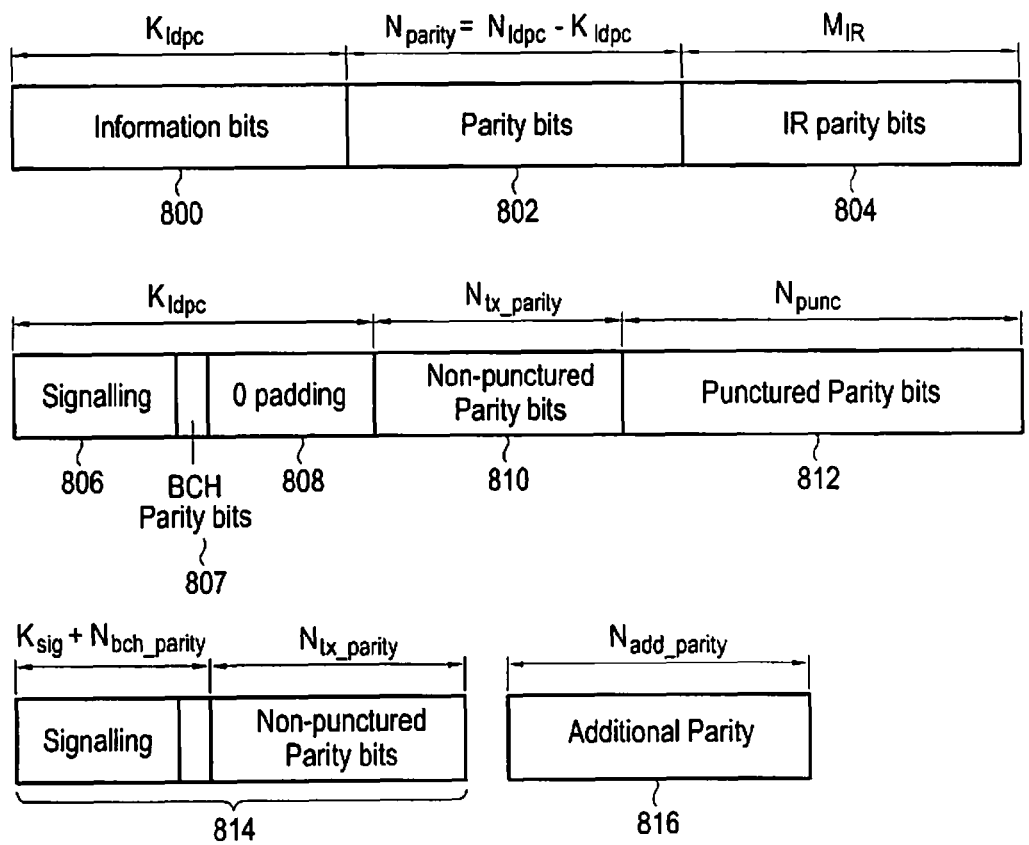
FIG. 8 is a diagram illustrating a structure of an LDPC code for supporting transmission of parity bits according to an embodiment of the present invention.

FIG. 8 is a diagram illustrating an LDPC code for supporting parity transmission according to an embodiment of the present invention.

Referring to FIG. 8, an LDPC codeword includes $K_{ldpc}$ LDPC information bits 800, $N_{parity}$ parity bits 802, and $M_{IR}$ Incremental Redundancy (IR) parity bits 804. For convenience, the $N_{parity}$ parity bits 802 and the $M_{IR}$ IR parity bits 804 are collectively referred to herein as parity bits. The structure of the LDPC code illustrated in FIG. 8 is designed considering the parity bits 802. Therefore, in puncturing, the IR parity bits 804 are punctured. The LDPC code of FIG. 8 may be expressed as parity bits, without discrimination between the parity bits 802 and the IR parity bits 804.

To encode signaling bits 806, the LDPC information bits 800 may include the signaling bits 806, parity bits 807 for a BCH code, and '0' padding bits 808 for shortening. The parity bits 802 and the IR parity bits 804 include non-punctured parity bits 810, and punctured parity bits 812. Herein, a detailed position (i.e., an index) of each bit is not relevant to the subject matter of the present invention, i.e., which bits between the parity bits 802 and the IR parity bits 804 are to be punctured and which bits therebetween are not to be punctured. Accordingly, a specific puncturing pattern, will not be described herein.

The parity bits 807 of the BCH code exist when a concatenated code of the BCH code and the LDPC code is used, and the BCH parity bits 807 will be omitted when only the LDPC code is used.

The signaling bits 806, the BCH parity bits 807, and the non-punctured parity bits 810 form a first part 814, which is later transmitted through the $i^{th}$ frame 702, as illustrated in FIG. 7. Some of the punctured parity bits 812 form an additional parity 816, which is later transmitted through the $(i-1)^{th}$ frame 700, as illustrated in FIG. 7. That is, some of the punctured parity bits 812 are the same as the additional parities 807 and 712.

The additional parity 708 may be determined a number of ways. For example, the punctured parity bits 812 may be preferentially selected as an additional parity.

For $K_{bch}=2100$, $K_{ldpc}=2160$, $N_{ldpc}=4320$, and $M_{IR}=4320$, $R_{ldpc}=K_{ldpc}/N_{lpdc}=\frac{1}{2}$ and $R_{IR}=K_{ldpc}/(N_{ldpc}+M_{ldpc})=\frac{1}{4}$. In this case, according to an embodiment of the present invention, $N_{punc}$ may be calculated, based on Equation 7, using Equation (14) below.

If $K_{sig} < 1350$ (14)

$$N_{punc} = \lfloor 1.3 \times (K_{bch} - K_{sig}) + 3357 \rfloor$$

else $$N_{punc} = \lfloor 1.35 \times (K_{bch} - K_{sig}) + 3320 \rfloor$$

In Equation (14), $A_1=1.3$, $B_1=3357$, $A_2=1.35$, $B_2=3320$, and $K_{th}=1350$. Therefore, among the parity bits 802 and the IR parity bits 804, $N_{punc}$ parity bits based on Equation (14) are punctured.

In accordance with another embodiment of the present invention, $N_{punc}$ parity bits obtained based on $N_{punc\_temp}$ of Equation (9), using Equations (10) to (12), may be punctured.

Detailed values of parameters used to calculate $N_{punc}$ may be determined according to a modulation scheme used for transmission and the number of Orthogonal Frequency Division Multiplexing (OFDM) symbols. For example, when $2^n$—Quadrature Amplitude Modulation (QAM) is used as a modulation scheme, the number of bits to be transmitted, $(K_{sig}+N_{bch\_parity}+N_{parity}+M_{IR}-N_{punc})$ is a multiple of n. Herein, $K_{sig}$ indicates the number of input signaling information bits, $N_{bch\_parity}$ indicates the number of parity bits of a BCH code, and n indicates an order of a modulation scheme.

The number of bits of the additional parity 712 of FIG. 7 or the additional parity 816 of FIG. 8 may be calculated using Equation (15).

$$N_{add\_parity} = 0.35 \cdot I_l \cdot (N_{parity} + M_{IR} - N_{punc}) \quad l = \{0, 1, 2, 3\} \quad (15)$$
$$= 0.35 \cdot I_l \cdot (6480 - N_{punc})$$

In Equation (15), $I_0=0$, $I_1=1$, $I_2=2$, and $I_3=3$. Further, $\alpha=0.35$ is applied to Equation (13), where $\alpha$ is a value selected to satisfy Equation (16) below.

$$\alpha = \max_x \{x | (x \cdot I_{L-1}+1) \cdot (N_{parity}+M_{IR}-A_2 \cdot (K_{bch}-K_{sig\_max})-B_2) < N_{parity}+M_{IR}\} \quad (16)$$

That is, $\alpha$ is determined to be a maximum value among values in which a sum of the number of first parity bits, $N_{tx\_parity}$, and the number of additional parity bits, $N_{add\_parity}$, which are transmitted when $I_l$ is the maximum value $I_{L-1}$ and $K_{sig}$ is the maximum length among input information bits, $K_{sig\_max}$, that is, $(N_{tx\_parity}+N_{add\_parity})$ is maximal and the sum is less than $(N_{parity}+M_{IR})$.

When the maximum length among the input information bits, $K_{sig\_max}$, is 2100, $N_{punc}=3320$, such that $N_{tx\_parity}=3160$, and when $I_l$ is the maximum value $I_{L-1}=I_3=3$, $N_{add\_parity}=0.35\times3\times3160=3318$, such that $N_{tx\_parity}+N_{add\_parity}=6478$, which is less than $N_{parity}+M_{IR}=6480$.

Hereinafter, an embodiment for obtaining more precise $N_{add\_parity}$ considering a modulation scheme used for transmission based on $N_{add\_parity}$ obtained through the foregoing equations will be described.

Equation (16) assumes that the BPSK modulation scheme is used. That is, $\alpha$ is determined such that the number of first parity bits and the number of additional parity bits transmitted when using the BPSK modulation scheme is used is less than $N_{parity}+M_{IR}$. Therefore, when another modulation scheme, e.g., QPSK, 16-QAM, or 64-QAM is used, correction with respect to $N_{add\_parity}$ is required such that the number of first parity bits and the number of additional parity bits is less than $N_{parity}+M_{IR}$. Therefore, the number of temporary additional parity bits may be obtained using Equation (17).

$$N_{add\_parity\_temp} = \min((N_{parity}-N_{punc}), \lfloor 0.35 \times K \cdot (N_{parity}-N_{punc}) \rfloor) \quad (17)$$

In Equation (17), K indicates an L1 additional parity ratio, and is another expression of $I_l$ from Equations (13) and (15). In accordance with an embodiment of the present invention, K may be transmitted from the transmitter to the receiver through signaling 'L1_AP_RATIO'. For example, 'L1_AP_RATIO' is a 2-bit parameter, and when this parameter is '00', K=0; for the parameter of '01', K=1; K=2 for the parameter of '10'; and K=3 for the parameter of '11'.

Taking $N_{add\_parity\_temp}$ of Equation (17) and a modulation order, the final number of additional parity bits may be calculated using Equation (18a).

$$N_{add\_parity} = \left\lceil \frac{N_{add\_parity\_temp}}{2\eta_{MOD}} \right\rceil \times 2\eta_{MOD} \quad (18a)$$

In Equation (18a), $\eta_{MOD}$ indicates a modulation order, which is 1, 2, 4, and 6 for BPSK, QPSK, 16-QAM, and 64-QAM, respectively.

The number of additional parity bits, $N_{add\_parity}$ is adjusted in Equation (18a) to cause $N_{add\_parity}$ to be a multiple of the number of columns of the block interleaver. The block interleaver is used when each bit of the additional parity is bit-interleaved.

When the block interleaver is not used, e.g., when only BPSK and QPSK are used, Equation (18a) can be converted into Equation (18b).

$$N_{add\_parity} = \left\lceil \frac{N_{add\_parity\_temp}}{\eta_{MOD}} \right\rceil \times \eta_{MOD} \quad (18b)$$

$N_{add\_parity}$ is determined according to the number of OFDM symbols used for transmission.

Information about the number of additional parity bits can be transmitted from the transmitter to the receiver through a signaling parameter 'L1_AP_SIZE'. If a plurality of LDPC coded blocks are used for transmission, L1_AP_SIZE indicates a product of the number of coded blocks and $N_{add\_parity}$. For example, when two coded blocks are used, 'L1_AP_SIZE' may indicate $2\times N_{add\_parity}$. The receiver may know the number of additional parity bits from that signaling parameter.

Figure 9:
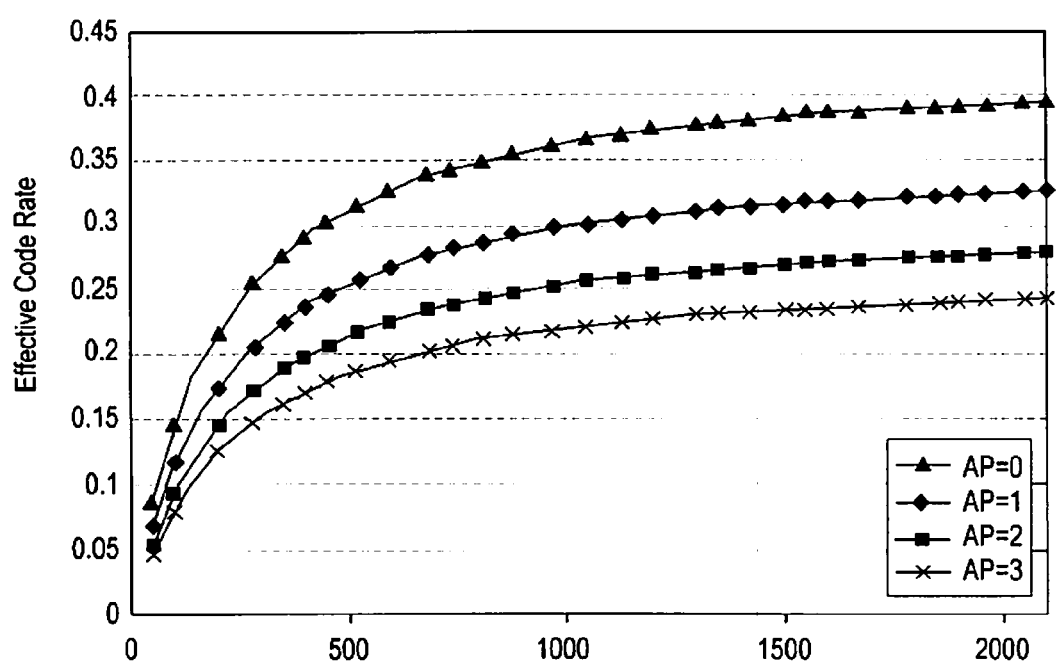
FIG. 9 is a graph illustrating a change in an effective code rate according to an embodiment of the present invention.

FIG. 9 is a graph illustrating a code rate when a number of additional parity bits is calculated using Equation (15), according to an embodiment of the present invention.

Specifically, the code rate is calculated using Equation (19).

$$R = \frac{K_{sig}}{K_{sig} + N_{tx\_parity} + N_{add\_parity}} \quad (19)$$

In Equation (19), $N_{tx\_parity}$ indicates the number of parity bits of the first part 814 of FIG. 8, and $N_{ldpc}+M_{IR}-N_{punc}=6480-N_{punc}$. $N_{add\_parity}$ indicates the number of additional parity bits of the part 816 of FIG. 8.

In FIG. 9, Additional Parity (AP)=0 corresponds to a code rate for $I_0=0$ in which the additional parity is not used, AP=1 corresponds to a code rate for $I_1=1$, AP=2 corresponds to a code rate for $I_2=2$, and AP=3 corresponds to a code rate for $I_3=3$.

In accordance with another embodiment of the present invention, the IR parity bits 804 of the LDPC code in FIG. 8 may be selectively used. That is, the parity bits 802 are preferentially generated for input information word bits, and the IR parity bits 804 may be generated only when the IR parity is necessary, thereby improving encoding/decoding efficiency.

As described above, the parity bits 802 are preferentially generated for input information bits, and for the parity bits 802, $N_{punc}$ may be calculated based on Equation (7), as shown in Equation (20).

$$\begin{aligned}&\text{if } K_{sig} < 1350 \\ &\quad N_{punc} = \lfloor 1.3 \times (K_{bch} - K_{sig}) - 963 \rfloor \\ &\text{else} \\ &\quad N_{punc} = \lfloor 1.35 \times (K_{bch} - K_{sig}) - 1000 \rfloor \end{aligned} \quad (20)$$

In Equation (20), if $N_{punc}$ is a positive integer, only the parity bits 802 are generated and only $N_{punc}$ parity bits of the parity bits 802 are punctured. However, if $N_{punc}$ is a negative value, both the parity bits 802 and the IR parity bits 804 are generated, and then only $(M_{IR}+N_{punc})$ bits of the IR parity bits 804 are punctured.

According to another embodiment of the present invention, $N_{punc}$ (obtained using Equations (10) to (12), based on Equation (20)) parity bits are punctured.

Figure 10:
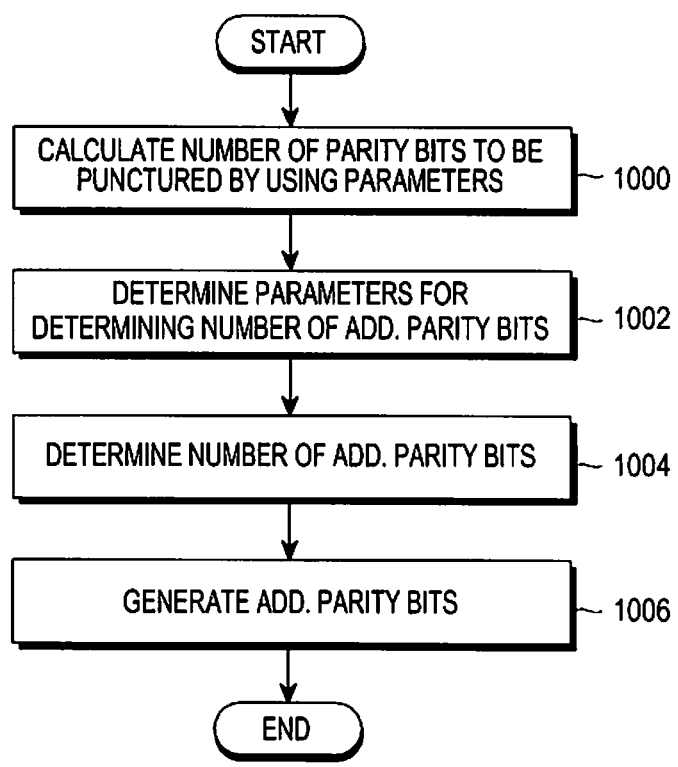
FIG. 10 is a flowchart illustrating a procedure for determining a number of two types of parity bits according to an embodiment of the present invention.

FIG. 10 is a flowchart illustrating a procedure for determining a number of two types of parity bits according to an embodiment of the present invention.

Referring to FIG. 10, in step 1000, the number of parity bits to be punctured is calculated using Equations (7) and (8) or Equations (9) to (12). In step 1002, parameters, $\alpha$, $I_l$, and $N_{tx\_parity}$ which are used in Equations (13), (15), and (17), are determined. In step 1002, already-determined $\alpha$ or $I_l$ may be used, and $I_l$ is expressed as K in Equations (17) and (18). As described above, K may be indicated by separate signaling 'L1_AP_RATIO'.

In step 1004, the number of additional parity bits, $N_{add\_parity}$ is determined based on Equation (13) or Equations (17) and (18), using the parameters determined in step 1002. In step 1006, the additional parity bits are configured according to the calculated number of additional parity bits.

Figure 11:
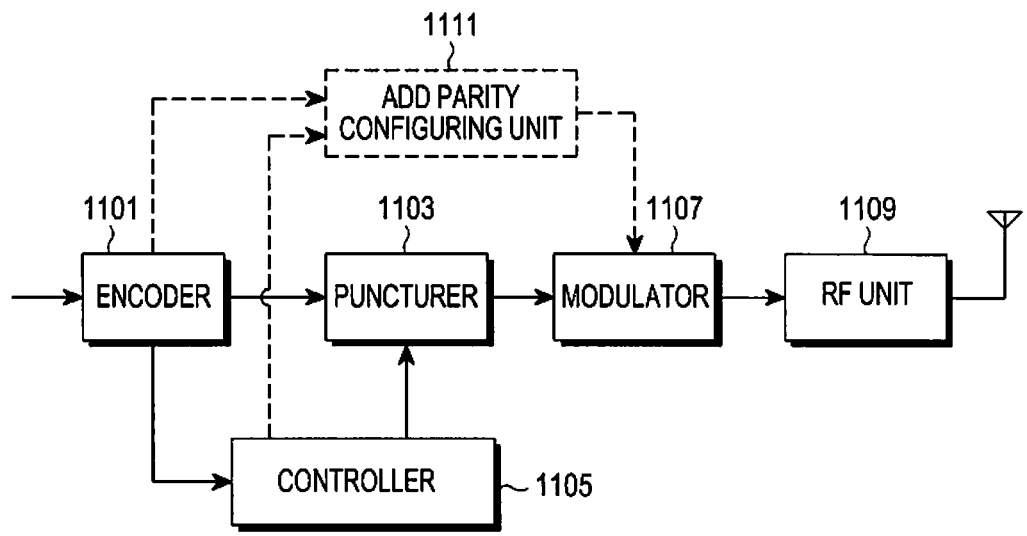
FIG. 11 a block diagram illustrating a transmission end according to an embodiment of the present invention.

FIG. 11 is a block diagram of a transmission end according to an embodiment of the present invention.

Referring to FIG. 11, the transmission end includes an encoder 1101, a puncturer 1103, a controller 1105, a modulator 1107, a Radio Frequency (RF) unit 1109, and selectively, an additional parity configuring unit 1111.

The encoder 1101 outputs encoded bits generated by encoding information word bits for transmission. For example, when a BCH/LDPC code is used, the encoder 1101 encodes BCH information bits having $K_{bch}$ bits to generate a BCH codeword having $K_{ldpc}$ bits. Thereafter, the encoder 1101 performs LDPC-encoding on the BCH codeword, thus generating and outputting an LDPC codeword having $N_{ldpc}$ bits.

Alternatively, the encoder 1101 generates and outputs an LDPC codeword having $(N_{ldpc}+M_{IR})$ bits.

Although not illustrated, the BCH information bits having $K_{bch}$ bits may be configured by padding $(K_{bch}-K_{sig})$ '0' bits into $K_{sig}$ input information bits. The padded $(K_{bch}-K_{sig})$ '0' bits are not to be transmitted.

The puncturer 1103 punctures a codeword provided from the encoder 1101 according to a puncturing pattern and a puncturing bit length $(K_{bch}-K_{sig})$, which are provided from the controller 1105. The controller 1105 calculates the puncturing bit length according to the number of information bits to control the puncturer 1103. For example, the controller 1105 determines A and B according to the number of input information bits (or the number of signaling bits) for transmission at the transmission end, and provides the determined A and B to the puncturer 1103.

Alternatively, the controller 1105 obtains the number of bits to be punctured from the determined parameters A and B, and provides the obtained number of bits to be punctured to the puncturer 1103. The modulator 1107 modulates, according to a corresponding modulation scheme, and outputs a signal provided from the puncturer 1103. The RF unit 1109 converts the modulated signal provided from the modulator 1107 into a high-frequency signal and transmits the high-frequency signal through an antenna.

If additional parity bits are to be transmitted, the controller 1105 determines the number of additional parity bits, as illustrated in FIG. 10, and provides the determined number of additional parity bits to the additional parity configuring unit 1111. The additional parity configuring unit 1111 configures the additional parity bits and provides them to the modulator 1107. It should be noted that additional parities generated in the current frame are transmitted through a previous frame.

Assuming $(N_{ldpc}, K_{ldpc})$ LDPC encoding, $(K_{ldpc}-K_{sig})$ bits are shortened for an input information bit length $K_{sig}$. If a BCH code is concatenated, $(K_{bch}-K_{sig})$ bits are shortened for a BCH information bit length $K_{bch}$.

Figure 12:
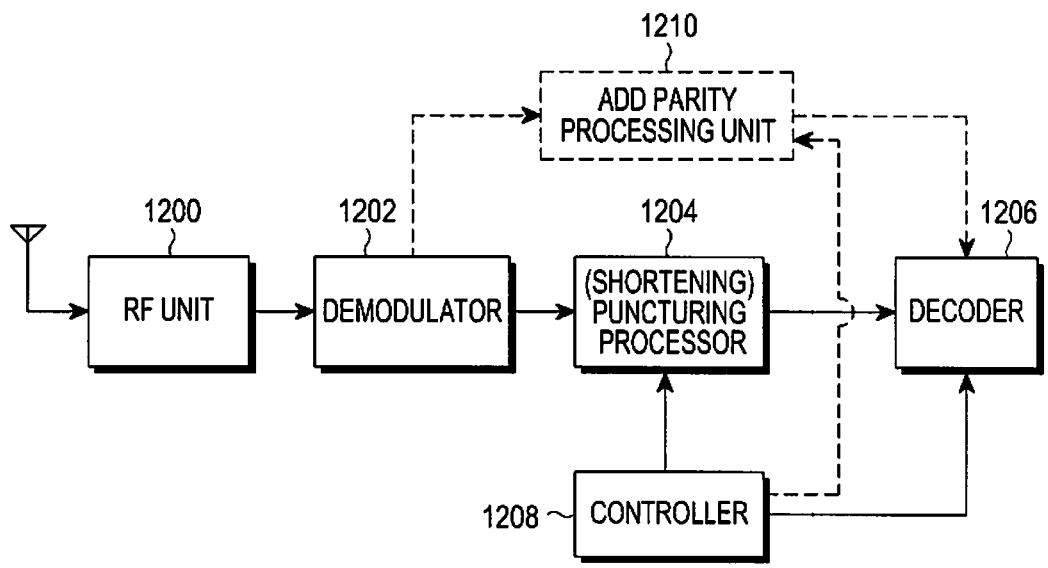
FIG. 12 is a block diagram illustrating a receiving end according to an embodiment of the present invention.

FIG. 12 is a block diagram of a reception end according to an embodiment of the present invention.

Referring to FIG. 12, the reception end includes an RF unit 1200, a demodulator 1202, a shortening/puncturing processor 1204, a decoder 1206, a controller 1208, and selectively, an additional parity processing unit 1210.

The RF unit 1200 receives a signal transmitted from the RF unit 1109 of the transmission end and provides the signal to the demodulator 1202.

The demodulator 1202 demodulates the signal provided from the RF unit 1200 by utilizing a demodulation scheme corresponding to a modulation scheme used in the modulator 1107 of the transmission end. For example, the demodulator 1202 obtains a Log Likely Ratio (LLR), by taking a log of a ratio of a probability of each bit being 1 to a probability of each bit being 0 for each of shortened/punctured encoded bits and additional parity bits transmitted from the modulator 1107, and provides the obtained LLR to the shortening/puncturing processor 1204 and the additional parity processing unit 1210. The additional parity processor 1201 is optional, in that it is not used when additional parity is not received.

The shortening/puncturing processor 1204 receives an output signal of the demodulator 1202, generates values corresponding to shortening and puncturing with respect to the bits shortened and punctured by the transmission end, and pads the values to the output signal of the demodulator 1202. For example, for a shortened bit, an LLR value is the (+) or (−) maximum value among a decoder input value, and for a punctured bit, an LLR value is '0'. The shortening/puncturing processor 1204 receives information about the number of shortened and punctured bits and index from the controller 1208. That is, the controller 1208 calculates a puncturing bit length according to the number of information bits of the encoder 1101 of the transmission end and controls the shortening/puncturing processor 1204.

For example, the controller 1208 determines A and B according to the number of bits of signaling information for transmission at the transmission end, as illustrated in FIG. 6, and provides the determined A and B to the shortening/puncturing processor 1204.

Alternatively, the controller 1208 obtains the number of bits to be punctured from the determined parameters A and B and provides the obtained number of bits to be punctured to the shortening/puncturing processor 1204. Information about the number of input information bits input to the encoder of the transmission end may be transmitted to the controller 1208 of the receiver through, for example, additional signaling.

The decoder 1206 receives and decodes output values of the shortening/puncturing processor 1204 to reconstruct information word bits. For example, when a BCH/LDPC code is used, the decoder 1206 receives $N_{ldpc}$ or $(N_{ldpc}+M_{IR})$ LLR values and performs LDPC-decoding thereon to reconstruct $K_{ldpc}$ bits, and then reconstruct $K_{bch}$ information word bits through BCH decoding.

When additional parity bits are transmitted, the controller 1208 determines the number of additional parity bits, as illustrated in FIG. 10, and provides the determined number of additional parity bits to the additional parity processing unit 1210. The additional parity processing unit 1210 receives LLR values for the additional parity bits generated by the transmission end from the demodulator 1202 and provides the LLR values to the decoder 1206. The decoder 1206 performs decoding by using both the values provided from the shortening/puncturing processor 1204 and the values provided from the additional parity processing unit 1210. It should be noted that additional parities received in the current frame are used in decoding of the next frame according to processing at the transmitter. That is, in decoding of a code received in the current frame, additional parity bits received in the previous frame are used.

According to the above-described embodiments of the present invention, by adaptively selecting a shortening/puncturing rate based on channel status information required in a broadcasting/communication system, similar performance is maintained, regardless of a length of an information word, thereby maintaining system stability.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method for transmitting information in a broadcasting/communication system, the method comprising:
   comparing a number of bits of an information word to be transmitted with a predetermined threshold value;
   if the number of bits of the information word is less than the predetermined threshold value, obtaining a predetermined first parameter pair comprising a first ratio and a first correction factor;
   if the number of bits of the information word is not less than the predetermined threshold value, obtaining a predetermined second parameter pair comprising a second ratio and a second correction factor;
   determining a number of bits to be punctured based on one of the first parameter pair and the second parameter pair; and
   puncturing the determined number of bits to be punctured, with respect to parity bits of a codeword generated by encoding the information word,
   wherein each of the first ratio and the second ratio is a ratio of a number of bits to be shortened to the number of bits to be punctured, and
   wherein the number of bits to be punctured is determined based on a value calculated by applying one of the first parameter pair and the second parameter pair to a difference between a number of input bits for an encoder and a number of bits of the information word.

2. The method of claim 1, wherein determining the number of bits to be punctured comprises:
   calculating a temporary number of bits to be punctured based on one of the first parameter pair and the second parameter pair;
   calculating a temporary number of encoded bits based on the calculated temporary number of bits to be punctured;
   calculating a final number of encoded bits based on the temporary number of encoded bits and a modulation order; and
   determining the number of bits to be punctured based on the temporary number of bits to be punctured, the temporary number of encoded bits, and the final number of encoded bits.

3. The method of claim 2, wherein the temporary number of bits to be punctured is determined by:

$$N_{punc\_temp} = \begin{cases} \text{If } K_{sig} < 1350, & \lfloor 1.3 \times (K_{bch} - K_{sig}) + 3357 \rfloor \\ \text{Otherwise}, & \lfloor 1.35 \times (K_{bch} - K_{sig}) + 3320 \rfloor \end{cases},$$

wherein $N_{punc\_temp}$ indicates the temporary number of bits to be punctured, $K_{bch}$, indicates an input bit length of a Bose, Chaudhuri, Hocquenghem (BCH) encoder, $K_{sig}$ indicates the number of bits of the information word, (1.3, 3357) indicates the first parameter pair, (1.35, 3320) indicates the second parameter pair, and the predetermined threshold value is 1350.

4. The method of claim 1, further comprising:
   determining at least one third parameter for determining an additional parity bit length;
   determining the additional parity bit length based on the at least one third parameter; and
   encoding the information word to generate additional parity bits based on the additional parity bit length.

5. The method of claim 4, wherein the at least one third parameter includes a ratio of a number of first parity bits transmitted in a frame transmitting the information word to the number of additional parity bits, or a number of first parity bits, $N_{tx\_parity}$.

6. The method of claim 4, wherein the additional parity bit length is determined by:

$$N_{add\_parity} = \left\lceil \frac{N_{add\_parity\_temp}}{2\eta_{MOD}} \right\rceil \times 2\eta_{MOD},$$

where $\eta_{MOD}$ indicates a modulation order, which is 1, 2, 4, and 6 for Binary Phase Shift Keying (BPSK), Quadrature PSK (QPSK), 16-ary Quadrature Amplitude Modulation (16-QAM), and 64-ary QAM (64-QAM), respectively, and $N_{add\_parity\_temp}$ is determined by:

$$N_{add\_parity\_temp} = \min((N_{parity} - N_{punc}), \lfloor 0.35 \times K \cdot (N_{parity} - N_{punc}) \rfloor),$$

where $N_{parity}$ indicates the number of parity bits, $N_{punc}$ indicates the number of bits to be punctured, and K indicates an additional parity ratio.

7. An apparatus for transmitting information in a broadcasting/communication system, the apparatus comprising:
an encoder for encoding an information word to be transmitted and outputting a codeword;
a controller for comparing a number of bits of the information word with a predetermined threshold value, obtaining a predetermined first parameter pair comprising a first ratio and a first correction factor, if the number of bits of the information word is less than the threshold value, obtaining a predetermined second parameter pair comprising a second ratio and a second correction factor, if the number of bits of the information word is not less than the threshold value, and determining a number of bits to be punctured, based on one of the first parameter pair and the second parameter pair; and
a puncturer for puncturing the determined number of bits to be punctured, with respect to parity bits of the codeword,
wherein each of the first ratio and the second ratio is a ratio of a number of bits to be shortened to the number of bits to be punctured, and
wherein the number of bits to be punctured is determined based on a value calculated by applying one of the first parameter pair and the second parameter pair to a difference between a number of input bits for an encoder and a number of bits of the information word.

8. The apparatus of claim 7, wherein the controller determines the number of bits to be punctured by calculating a temporary number of bits to be punctured, based on one of the first parameter pair and the second parameter pair, calculating a temporary number of encoded bits by using the calculated temporary number of bits to be punctured, calculating a final number of encoded bits by using the temporary number of encoded bits and a modulation order, and determines the number of bits to be punctured, based on the temporary number of bits to be punctured, the temporary number of encoded bits, and the final number of encoded bits.

9. The apparatus of claim 8, wherein the temporary number of bits to be punctured is determined by:

$$N_{punc\_temp} = \begin{cases} \text{If } K_{sig} < 1350, & \lfloor 1.3 \times (K_{bch} - K_{sig}) + 3357 \rfloor \\ \text{Otherwise,} & \lfloor 1.35 \times (K_{bch} - K_{sig}) + 3320 \rfloor \end{cases},$$

wherein $N_{punc\_temp}$ indicates the temporary number of bits to be punctured, $K_{bch}$ indicates an input bit length of a Bose, Chaudhuri, Hocquenghem (BCH) encoder, $K_{sig}$ indicates the number of bits of the information word, (1.3, 3357) indicates the first parameter pair, (1.35, 3320) indicates the second parameter pair, and the predetermined threshold value is 1350.

10. The apparatus of claim 7, wherein the controller determines at least one third parameter for determining an additional parity bit length, determines the additional parity bit length based on the at least one third parameter, and controls the encoder to encode the information word based on the additional parity bit length to generate additional parity bits.

11. The apparatus of claim 10, wherein the at least one third parameter comprises at least one of:

a ratio of a number of first parity bits transmitted in a frame transmitting the information word to the number of additional parity bits; and
a number of first parity bits, $N_{tx\_parity}$.

12. The apparatus of claim 10, wherein the additional parity bit length is determined by:

$$N_{add\_parity} = \left\lceil \frac{N_{add\_parity\_temp}}{2\eta_{MOD}} \right\rceil \times 2\eta_{MOD},$$

where $\eta_{MOD}$ indicates a modulation order which is 1, 2, 4, and 6 for Binary Phase Shift Keying (BPSK), Quadrature PSK (QPSK), 16-ary Quadrature Amplitude Modulation (16-QAM), and 64-ary QAM (64-QAM), respectively, and $N_{add\_parity\_temp}$ is determined by:

$$N_{add\_parity\_temp} = \min((N_{parity} - N_{punc}), \lfloor 0.35 \times K \cdot (N_{parity} - N_{punc}) \rfloor),$$

where $N_{parity}$ indicates the number of parity bits, $N_{punc}$ indicates the number of bits to be punctured, and K indicates an additional parity ratio.

13. A method for receiving information in a broadcasting/communication system, the method comprising:
comparing a number of bits of an information word transmitted by a transmission end with a predetermined threshold value;
obtaining a predetermined first parameter pair comprising a first ratio and a first correction factor, if the number of bits of the information word is less than the predetermined threshold value;
obtaining a predetermined second parameter pair comprising a second ratio and a second correction factor, if the number of bits of the information word is not less than the predetermined threshold value;
determining a number of bits to be punctured, based on one of the first parameter pair and the second parameter pair;
generating values corresponding to bits punctured by the transmission end and padding the generated values to a modulated signal of a received signal to generate a decoder input by using the determined number of bits to be punctured; and
decoding the decoder input to reconstruct information word bits,
wherein each of the first ratio and the second ratio is a ratio of a number of bits to be shortened to the number of bits to be punctured, and
wherein the number of bits to be punctured is determined based on a value calculated by applying one of the first parameter pair and the second parameter pair to a difference between a number of input bits for an encoder and a number of bits of the information word.

14. The method of claim 13, wherein determining the number of bits to be punctured comprises:
calculating a temporary number of bits to be punctured based on one of the first parameter pair and the second parameter pair;
calculating a temporary number of encoded bits based on the calculated temporary number of bits to be punctured;
calculating a final number of encoded bits based on the temporary number of encoded bits and a modulation order; and determining the number of bits to be punctured based on the temporary number of bits to be punctured, the temporary number of encoded bits, and the final number of encoded bits.

15. The method of claim 14, wherein the temporary number of bits to be punctured is determined by:

$$N_{punc\_temp} = \begin{cases} \text{If } K_{sig} < 1350, & \lfloor 1.3 \times (K_{bch} - K_{sig}) + 3357 \rfloor \\ \text{Otherwise,} & \lfloor 1.35 \times (K_{bch} - K_{sig}) + 3320 \rfloor \end{cases},$$

wherein $N_{punc\_temp}$ indicates the temporary number of bits to be punctured, $K_{bch}$, indicates an input bit length of a Bose, Chaudhuri, Hocquenghem (BCH) encoder, $K_{sig}$ indicates the number of bits of the information word, (1.3, 3357) indicates the first parameter pair, (1.35, 3320) indicates the second parameter pair, and the predetermined threshold value is 1350.

16. The method of claim 13, further comprising:
determining at least one third parameter for determining an additional parity bit length;
determining the additional parity bit length based on the at least one third parameter; and
generating values corresponding to bits additionally punctured by the transmission end by using the additional parity bit length and padding the generated values corresponding to the additionally punctured bits to the modulated signal of the received signal to generate the decoder input.

17. The method of claim 16, wherein the at least one third parameter includes at least one of a ratio of the number of first parity bits transmitted in a frame transmitting the information word to the number of additional parity bits, and a number of first parity bits, $N_{tx\_parity}$.

18. The method of claim 16, wherein the additional parity bit length is determined by:

$$N_{add\_parity} = \left\lceil \frac{N_{add\_parity\_temp}}{2\eta_{MOD}} \right\rceil \times 2\eta_{MOD},$$

where $\eta_{MOD}$ indicates a modulation order which is 1, 2, 4, and 6 for Binary Phase Shift Keying (BPSK), Quadrature PSK (QPSK), 16-ary Quadrature Amplitude Modulation (16-QAM), and 64-ary QAM (64-QAM), respectively, and $N_{add\_parity\_temp}$ is determined by:

$N_{add\_parity\_temp} = \min((N_{parity} - N_{punc}), \lfloor 0.35 \times K \cdot (N_{parity} - N_{punc}) \rfloor),$ where $N_{parity}$ indicates the number of parity bits, $N_{punc}$ indicates the number of bits to be punctured, and K indicates an additional parity ratio.

19. An apparatus for receiving information in a broadcasting/communication system, the apparatus comprising:
a demodulator for demodulating a received signal;
a controller for obtaining information about a number of bits of an information word transmitted from a transmission end, comparing the number of bits of the information word transmitted by the transmission end with a predetermined threshold value, obtaining a predetermined first parameter pair comprising a first ratio and a first correction factor, if the number of bits of the information word is less than the predetermined threshold value, obtaining a predetermined second parameter pair comprising a second ratio and a second correction factor, if the number of bits of the information word is not less than the predetermined threshold value, and determining a number of bits to be punctured, based on one of the first parameter pair and the second parameter pair;
a puncturing processor for generating values corresponding to the bits punctured by the transmission end by using the determined number of bits to be punctured, and padding the generated values to an output signal of the demodulator; and
a decoder for receiving and decoding output values of the puncturing processor to reconstruct information word bits,
wherein each of the first ratio and the second ratio is a ratio of a number of bits to be shortened to the number of bits to be punctured; and
wherein the number of bits to be punctured is determined based on a value calculated by applying one of the first parameter pair and the second parameter pair to a difference between a number of input bits for an encoder and a number of bits of the information word.

20. The apparatus of claim 19, wherein the controller calculates a temporary number of bits to be punctured using one of the first parameter pair and the second parameter pair, calculates a temporary number of encoded bits using the calculated temporary number of bits to be punctured, calculates a final number of encoded bits using the temporary number of encoded bits and a modulation order, and determines the number of bits to be punctured based on the temporary number of bits to be punctured, the temporary number of encoded bits, and the final number of encoded bits.

21. The apparatus of claim 20, wherein the temporary number of bits to be punctured is determined by:

$$N_{punc\_temp} = \begin{cases} \text{If } K_{sig} < 1350, & \lfloor 1.3 \times (K_{bch} - K_{sig}) + 3357 \rfloor \\ \text{Otherwise,} & \lfloor 1.35 \times (K_{bch} - K_{sig}) + 3320 \rfloor \end{cases},$$

wherein $N_{punc\_temp}$ indicates the temporary number of bits to be punctured, $K_{bch}$ indicates an input bit length of a Bose, Chaudhuri, Hocquenghem (BCH) encoder, $K_{sig}$ indicates the number of bits of the information word, (1.3, 3357) indicates the first parameter pair, (1.35, 3320) indicates the second parameter pair, and the predetermined threshold value is 1350.

22. The apparatus of claim 19, wherein the controller determines at least one third parameter for determining an additional parity bit length, determines the additional parity bit length based on the at least one third parameter, and controls the puncturing processor to generate values corresponding to bits additionally punctured by the transmission end by using the additional parity bit length and pad the generated values corresponding to the additionally punctured bits to the modulated signal of the received signal to generate a decoder input.

23. The apparatus of claim 22, wherein the at least one third parameter comprises at least one of:
a ratio of a number of first parity bits transmitted in a frame transmitting the information word to the number of additional parity bits; and
a number of first parity bits, $N_{tx\_parity}$.

24. The apparatus of claim 22, wherein the additional parity bit length is determined by:

$$N_{add\_parity} = \left\lceil \frac{N_{add\_parity\_temp}}{2\eta_{MOD}} \right\rceil \times 2\eta_{MOD},$$

where $\eta_{MOD}$ indicates a modulation order which is 1, 2, 4, and 6 for Binary Phase Shift Keying (BPSK), Quadrature PSK (QPSK), 16-ary Quadrature Amplitude Modulation (16-QAM), and 64-ary QAM (64-QAM), respectively, and $N_{add\_parity\_temp}$ is determined by:

$$N_{add\_parity\_temp} = \min((N_{parity} - N_{punc}), \lfloor 0.35 \times K \cdot (N_{parity} - N_{punc}) \rfloor),$$

where $N_{parity}$ indicates the number of parity bits, $N_{punc}$ indicates the number of bits to be punctured, and $K$ indicates an additional parity ratio.

\* \* \* \* \*